United States Patent
Huang et al.

(10) Patent No.: US 7,875,575 B2
(45) Date of Patent: *Jan. 25, 2011

(54) COMPOSITIONS AND METHODS FOR WATER AND GAS SHUT-OFF IN SUBTERRANEAN WELLS WITH VES FLUIDS

(75) Inventors: Tianping Huang, Spring, TX (US); James B. Crews, Willis, TX (US); John R. Willingham, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 352 days.

This patent is subject to a terminal disclaimer.

(21) Appl. No.: 11/697,954

(22) Filed: Apr. 9, 2007

(65) Prior Publication Data

US 2008/0248978 A1    Oct. 9, 2008

(51) Int. Cl.
    C09K 8/74      (2006.01)
    C09K 8/04      (2006.01)
    C09K 8/504     (2006.01)
    C23F 11/18     (2006.01)
    E21B 43/26     (2006.01)

(52) U.S. Cl. .................. 507/269; 507/271; 507/272; 507/276; 166/305.1

(58) Field of Classification Search .............. 507/269, 507/271, 272, 276; 166/279, 305.1
    See application file for complete search history.

(56) References Cited

U.S. PATENT DOCUMENTS

| | | |
|---|---|---|
| 4,004,639 A | 1/1977 | Sandiford |
| 5,735,349 A | 4/1998 | Dawson et al. |
| 5,964,295 A | 10/1999 | Brown et al. |
| 6,433,075 B1 | 8/2002 | Davies et al. |
| 6,605,570 B2 | 8/2003 | Miller et al. |
| 6,703,352 B2 | 3/2004 | Dahayanake et al. |
| 6,767,869 B2 | 7/2004 | DiLullo et al. |
| 6,828,280 B2 | 12/2004 | England et al. |
| 7,081,439 B2 | 7/2006 | Sullivan et al. |
| 2003/0188870 A1 | 10/2003 | Hinkel et al. |
| 2004/0031611 A1 | 2/2004 | Huang et al. |

(Continued)

OTHER PUBLICATIONS

R. Bandyopadhyay, et al., "Effect of Silica Colloids on the Rheology of Viscoelastic Gels Formed by the Surfactant Cetyl Trimethylammonium Tosylate," Journal of Colloid and Interface Science 2005, pp. 585-591, vol. 283.

(Continued)

*Primary Examiner*—Timothy J. Kugel
*Assistant Examiner*—Aiqun Li
(74) *Attorney, Agent, or Firm*—Mossman Kumar & Tyler PC

(57) ABSTRACT

Viscoelastic surfactant (VES) based fluid systems for zone isolation and flow control are effective in water and/or gas shutoff applications. The fluid systems may include brine, a viscosity enhancer, as well as the VES, and optionally a stabilizer for high temperature applications. The stabilizer may be an alkali earth metal oxide, alkali earth metal hydroxide, alkali metal oxide, alkali metal hydroxide, $Al_2O_3$, and mixtures thereof. The viscosity enhancer may include pyroelectric particles, piezoelectric particles, and mixtures thereof. The fluid system is easy to pump into the formation, and after pumping, the fluid system will generate very high viscosities to prevent the VES fluid from flowing back to stop undesirable water and/or gas production.

18 Claims, 6 Drawing Sheets

U.S. PATENT DOCUMENTS

2005/0252658 A1* 11/2005 Willingham et al. ........ 166/279
2007/0056737 A1   3/2007 Crews et al.
2007/0151726 A1*  7/2007 Crews et al. ................ 166/246
2008/0139419 A1*  6/2008 Huang ........................ 507/276

OTHER PUBLICATIONS

E. Ali et al., "Effective Gas Shutoff Treatments in a Fractured Carbonate Field in Oman," SPE Annual Technical Conference, Sep. 24-27, 2006, pp. 1-12, SPE 102244, San Antonio, TX.

* cited by examiner

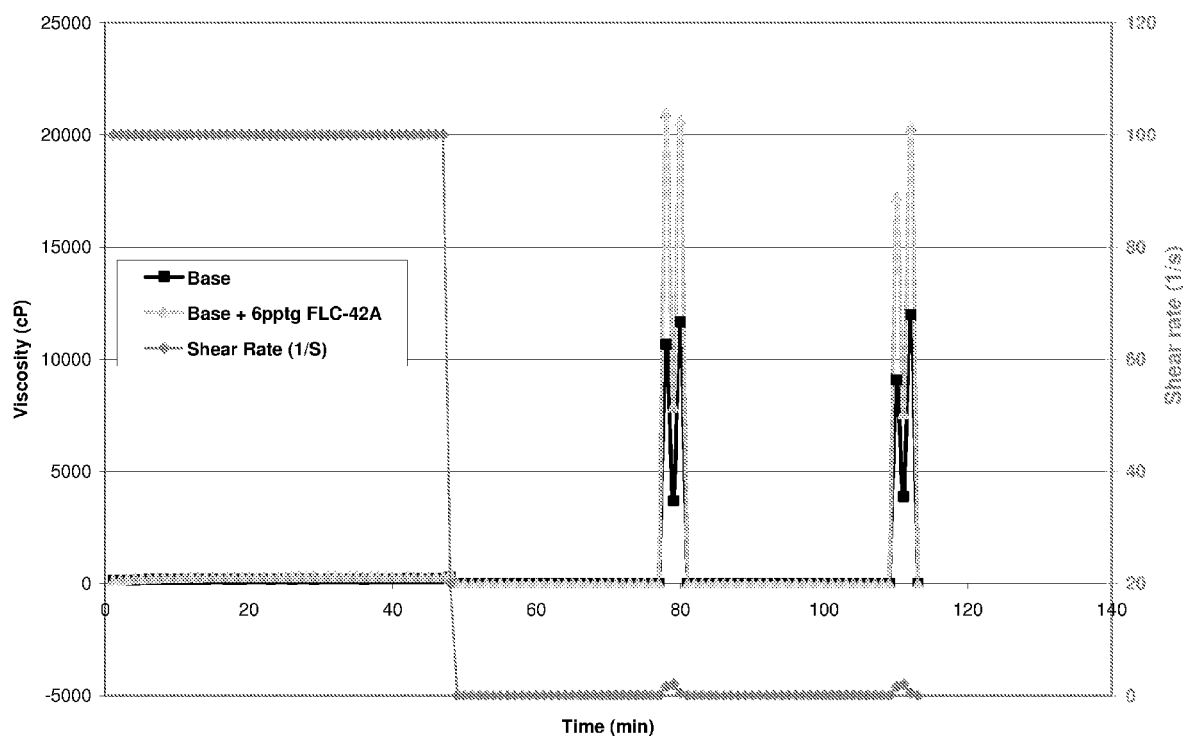
FIG. 1 - Viscosities of VES fluids with and without viscosity enhancer at 150°F (66°C)
Base: 13.0ppg (1.6 kg/m3) CaCl2/CaBr2 + 4%VES

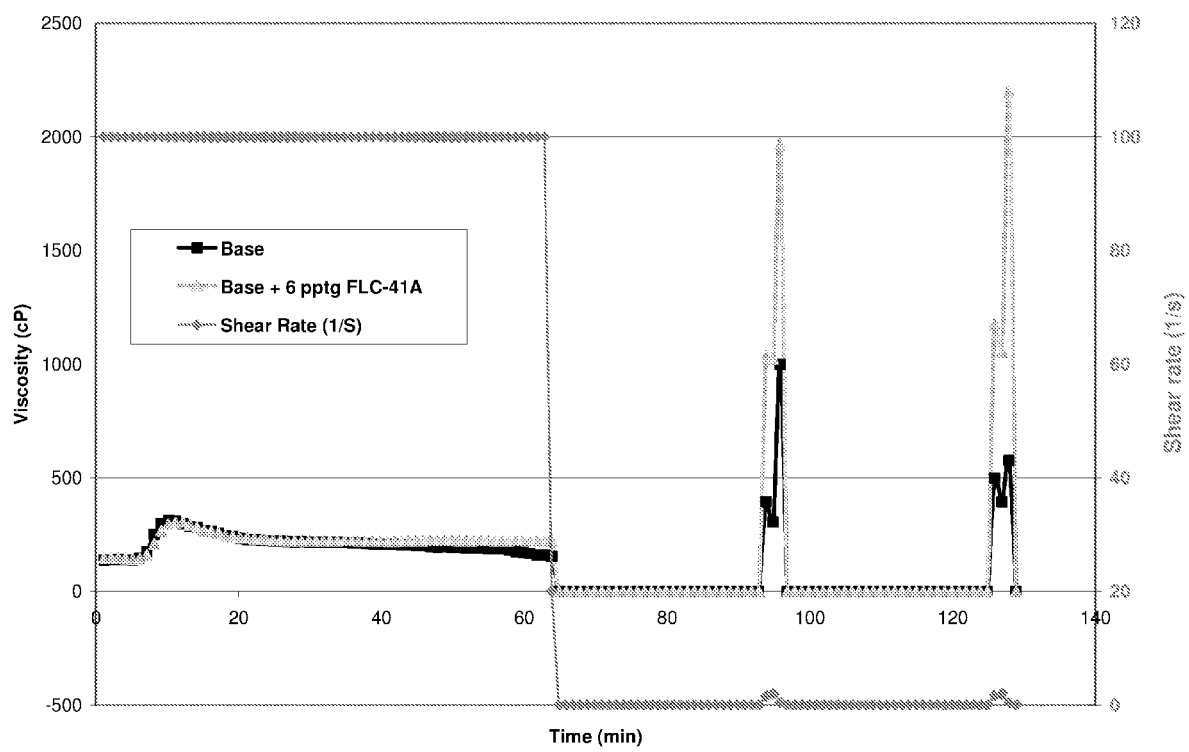
FIG. 2 - Viscosities of VES fluids with and without viscosity enhancer at 250°F (121°C)
Base: 13.0ppg (1.6 kg/m3) CaCl2/CaBr2 + 4%VES

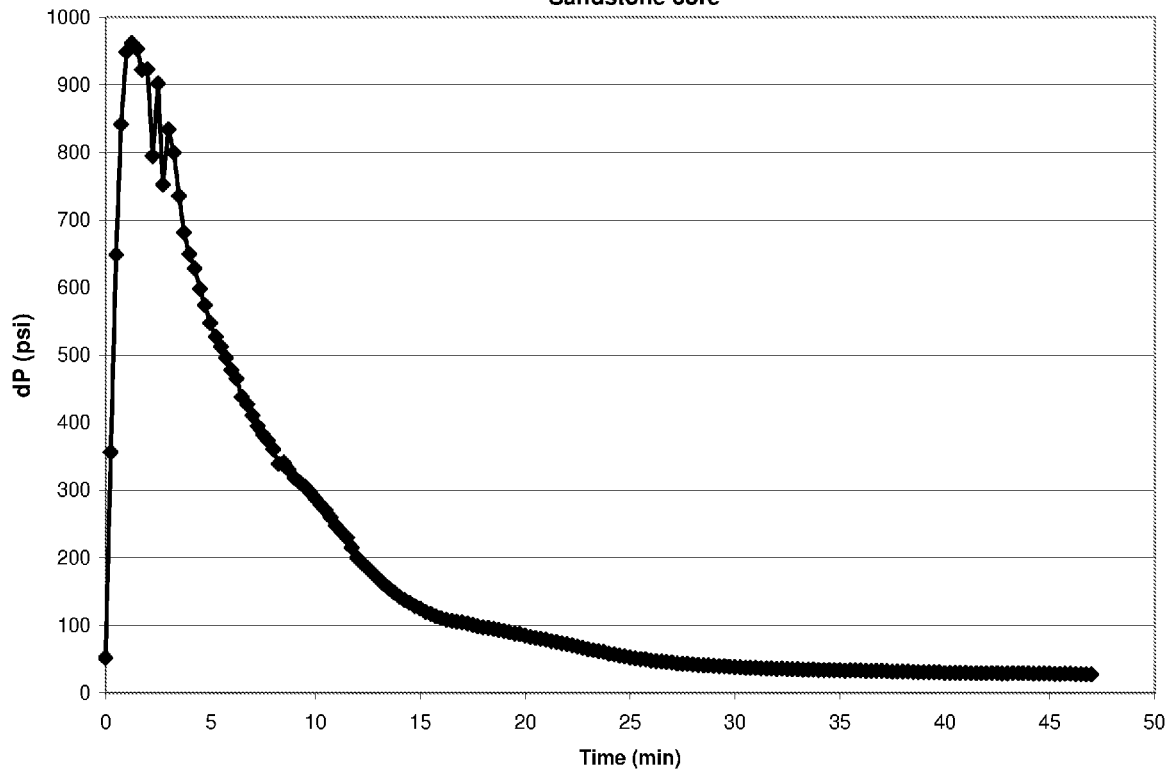
FIG. 3 - Flow back pressure recordings for 4%VES + 3%KCl at 150°F (66°C) with 1"x 6" Berea Sandstone core

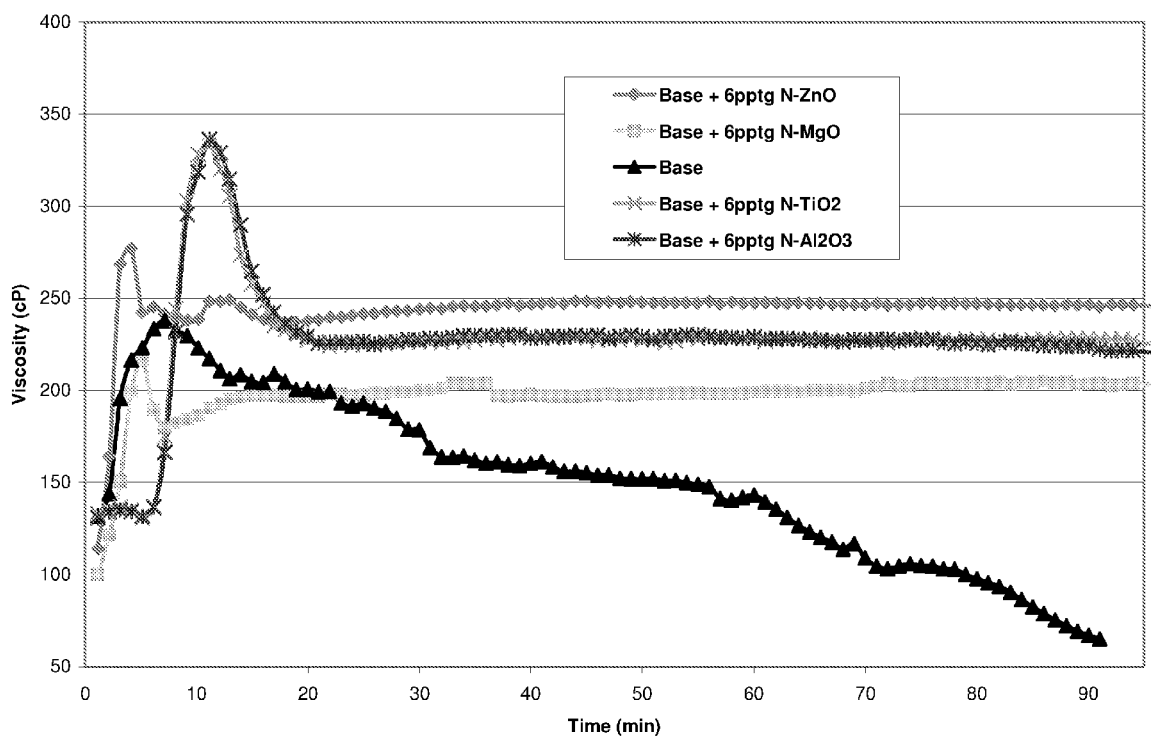
FIG. 4- Viscosities of VES fluids at 250°F (121°C) and 100 1/s
Base : 13.0pptg (1.6 kg/m3) CaCl2/CaBr2 + 4% WG-3L

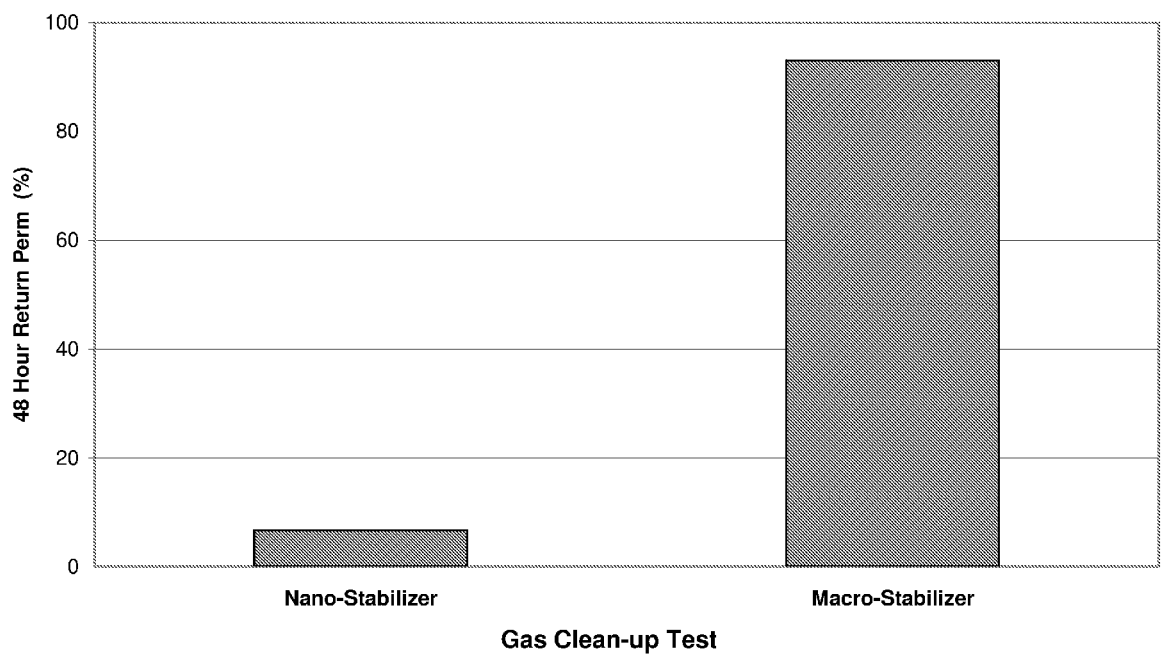
FIG. 5 - VES Clean-up to Gas
48 Hour Return Permeability of Berea Cores at 250°F (121°C)
Fluid: 13.0ppg Brine + 4%VES + 6 pptg Stabilizer

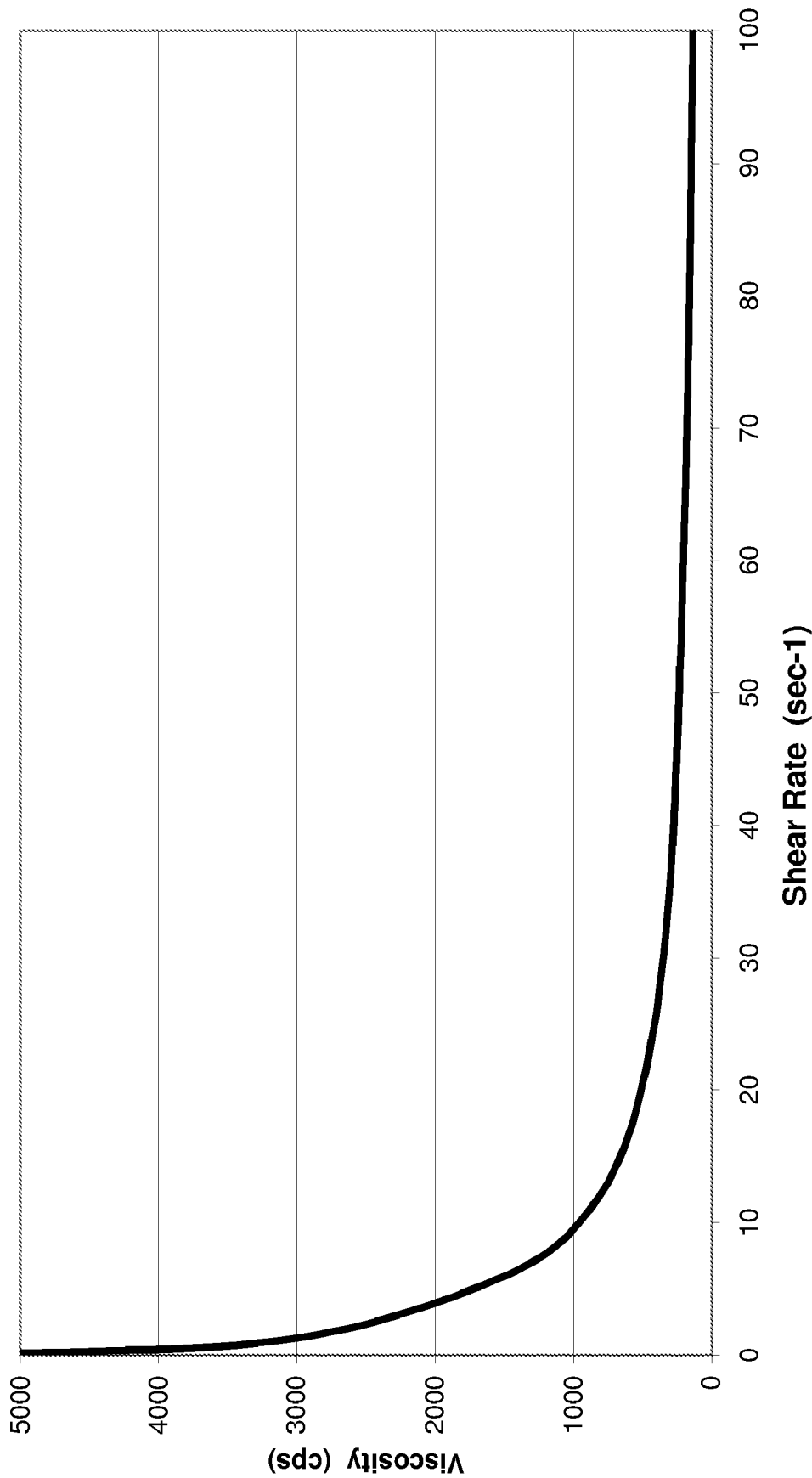

COMPOSITIONS AND METHODS FOR WATER AND GAS SHUT-OFF IN SUBTERRANEAN WELLS WITH VES FLUIDS

TECHNICAL FIELD

The present invention relates to methods and compositions to inhibit or shut-off the flow of water and/or gas in subterranean formations, and more particularly relates, in one embodiment, to methods of using VES-gelled aqueous fluids containing stabilizers and viscosity enhancers to inhibit or shut-off the flow of water and/or gas in subterranean formations during hydrocarbon recovery operations.

TECHNICAL BACKGROUND

Unwanted water and gas production is a major problem in maximizing the hydrocarbon production potential of a subterranean well. Tremendous costs may be incurred from separating and disposing of large amounts of produced water and/or gas, inhibiting the corrosion of tubulars, replacing tubular equipment downhole, and surface equipment maintenance. Shutting off unwanted water and/or gas production are necessary conditions to maintaining a productive field. While there is a wide array of treatments available to solve these problems, they all suffer from a number of difficulties, including, but not necessarily limited to, surface mixing and handling problems, etc.

For instance, traditional water and gas shut-off technology with chemicals uses sodium silicate solutions and crosslinked polymers. The silicate solution is typically not compatible with formation waters, since sodium silicate reacts with calcium chloride instantly to generate gel. In this approach, the two solutions may be injected in any order and must be separated by a slug of an inert aqueous spacer liquid. U.S. Pat. No. 4,004,639 provides chemicals to achieve water shut-off in producing wells. It uses base fluid sodium silicate solution and gelling agent ammonium sulfate. Those two solutions are injected and separated by a slug of an inert aqueous spacer liquid. However, these technologies cannot generate uniform gels to plug the porous medium and cannot place the gel deep into the formation. Several staged treatments are also required in pumping the fluids using these techniques.

Crosslinked polymer technology may need separate crosslinkers from the linear polymer fluid separated by a slug of an inert spacer in a form of multi-stage pumping. Crosslinked polymer technology may also use a delayed crosslinking method which may depend on the formation temperature and fluid traveling time in the formation as factors to delay the crosslinking.

There remains a need to find a chemical system that will simplify the pumping schedule and permit deep penetration into the formation to shut off the water and/or gas channels in an effective manner and keep oil flow channels open.

SUMMARY

There is provided, in one form, a method for inhibiting the flow of water and/or gas in a subterranean formation that involves injecting into the subterranean formation an aqueous viscoelastic treating fluid. The fluid includes brine, at least one viscoelastic surfactant, at least one viscosity enhancer, and optionally, for temperatures greater than about 180° F., at least one high temperature viscosity stabilizer. Suitable stabilizers include, but are not limited to, alkali earth metal oxides, alkali earth metal hydroxides, alkali metal oxides, alkali metal hydroxides, $Al_2O_3$, and mixtures thereof. Suitable viscosity enhancers include, but are not limited to, pyroelectric particles, piezoelectric particles, and mixtures thereof. The method permits the aqueous viscoelastic treating fluid to form a viscous plug in the subterranean formation and of a sufficient viscosity to inhibit the flow of water and/or gas in the formation.

BRIEF DESCRIPTION OF THE DRAWINGS

FIG. 1 is a graph of viscosity and shear rate as a function of time for fluids gelled with 4% VES containing 13.0 pptg (1.6 kg/m$^3$) $CaCl_2/CaBr_2$ brine, with and without 6 pptg (0.7 kg/m$^3$) FLC-42A viscosity enhancer at 150° F. (66° C.);

FIG. 2 is a graph of viscosity and shear rate as a function of time for fluids gelled with 4% VES containing 13.0 pptg (1.6 kg/m$^3$) $CaCl_2/CaBr_2$ brine, with and without 6 pptg (0.7 kg/m$^3$) FLC-41A viscosity enhancer at 250° F. (121° C.);

FIG. 3 is a plot of flow back pressure recordings for an aqueous viscoelastic fluid having 4% VES and 3% KCl at 150° F. (66° C.) using a 1"×6" (2.54 cm×15.2 cm) Berea Sandstone core;

FIG. 4 is a graph of the viscosities over time of various fluids containing 6 pptg (0.7 kg/m$^3$) of various viscosity enhancers or stabilizers in a base fluid of 13.0 pptg (1.6 kg/m$^3$) $CaCl_2/CaBr_2$ brine and 4% WG-3L VES surfactant at 250° F. (121° C.);

FIG. 5 is graph of return permeability to gas on 100 md Berea cores for VES fluids at 250° F. (121° C.) for 48 hours, where the fluids are 13.0 pptg (1.6 kg/m$^3$) $CaCl_2/CaBr_2$ brine and 4% WG-3L VES surfactant with 6 pptg (0.7 kg/m$^3$) stabilizers; and FIG. 6 is graph of VES viscosity changing with shear rates at 150° F. (66° C.), where the fluid is 4% WG-3L VES surfactant mixing 7% KCl; at very low shear rate, the viscosity of VES fluid reaches to 5000 cps.

DETAILED DESCRIPTION

The present invention provides a new aqueous viscoelastic treating fluid and method for zone isolation and flow control water and/or gas shut-off applications. The fluid system comprises brine, a VES, a viscosity enhancer, and optionally for high temperatures a viscosity stabilizer, which fluid system is added just prior to pumping to form a single stage treatment. The stabilizer may be crystal particles which are alkali earth metal oxides, alkali earth metal hydroxides, alkali metal oxides, alkali metal hydroxides, $Al_2O_3$, ZnO, and mixtures thereof, such as MgO, $TiO_2$, $Al_2O_3$, and the like, having a size ranging from about 1 nanometer to about 5 microns. The viscosity enhancer may be pyroelectric particles, piezoelectric particles, and mixtures thereof, in one non-limiting embodiment having a size ranging from about 1 nanometer to about 5 microns. In some cases there are viscosity enhancers that may perform both as high temperature stabilizers: that is, act toward enhancing VES viscosity at lower temperature (such as at 150° F. (66° C.)), but may act toward viscosity stability (i.e. thermal stability of the VES micelles) at higher temperatures (such as at 250° F. (121° C.). An example is ZnO which may function both as a viscosity enhancer at low temperature (please see FIG. 1) and as stabilizer at relatively high temperature (please see FIG. 4).

In one non-limiting embodiment, for environments under about 180° F. (82° C.) a high temperature viscosity stabilizer is not required. The term "stabilizer" herein is a component that helps or enables the VES fluid viscosity remain stable at fluid temperatures at or greater than about 180° F. (82° C.).

The inventive fluid system may be pumped into the target zone at a pressure less than formation fracture pressure, and after pumping is stopped, the aqueous viscoelastic treating fluid will generate very high viscosities at static and low shear rate conditions in the porous media of underground formation. Since the viscous plug occurs in situ, better control on the placement of the treatment is achieved and deeper penetration of the shut-off fluid is accomplished with all of the effective permeability of the target zone receiving an effective flow control or plugging agent. The flow of the VES fluid back will stop, prevent, retard or inhibit unwanted or undesirable water and/or gas production. For high permeability or naturally fractured active zones, the aqueous viscoelastic treating fluid herein will selectively plug unwanted water and/or gas flow channels, and will let oil flow channels form and let the oil be produced, since oil contacting the VES fluid will break or reduce the viscosity thereof. For regular and low permeability zones, it takes longer time to form oil flow channels because the contact area between oil and VES fluid in the porous media is smaller than in high permeability zones.

A series of laboratory tests have shown that the system can successfully shut off the water and gas production zones in various reservoir conditions from about 70° F. to about 300° F. (about 21° C. to about 150° C.). It is expected that the method and compositions herein may be effectively used in a broader temperature range between about 50° F. to about 350° F. (about 10° C. to about 177° C.). The system has very low viscosity at high shear rates, which means it is easy to pump, and has very high viscosity at low shear rates, which means that after pumping is stopped, the fluid plug at the zone prevents, inhibits, retards or stops unwanted water and gas flow to the wellbore. Without wishing to be limited to any particular parameter range, it is expected that in one embodiment of the invention, the gel strength of the gels formed will range from about 500 to about 35,000 cP, preferably from about 1000 to about 20,000 cP. The single stage treatment may be pumped into targeted formations to provide lost circulation control on water based fluids.

It will be appreciated that although the methods and compositions herein have been spoken of as being able to completely shut off water and/or gas flow in subterranean formations, that the inventive methods and compositions are considered successful even if less than complete shut-off is accomplished. Inhibition, reduction, diminishing, decreasing, and lessening of the water and/or gas flow through the use of viscous plugs herein are all considered successful, as are the complete shut-off, prevention, cessation, stoppage, end and termination of water flow, that is, complete control of the water and/or gas flow.

Magnesium oxide particles and powders have been used as stabilizers for VES-gelled aqueous fluids at temperatures from about 180 to about 300° F. (about 82 to about 149° C.) as disclosed in U.S. patent application Ser. No. 11/125,465, incorporated herein in its entirety by reference. It will be appreciated that although MgO particles are noted throughout the application herein as one representative or preferred type of stabilizer, other alkaline earth metal oxides and/or alkaline earth metal hydroxides may be used in the methods and compositions herein. Additionally, the alkali metal hydroxides and alkali metal oxides may be used alone or in combination with the alkaline earth metal oxides and hydroxides.

The alkali metal hydroxide NaOH has been found to improve the thermal stability of VES fluids. The alkali metal hydroxide additives LiOH, NaOH, and KOH readily dissolve in water and will travel wherever the VES fluid flows during a treatment, and therefore will be easily removed from the reservoir with the VES fluid and may not induce particulate pore plugging type formation damage.

Core flow tests with VES-STA1 MgO particles high temperature VES stabilizer product developed by Baker Oil Tools showed plating out of most of the MgO particles on the test core face during VES-gelled fluid injection into the cores. This MgO product has a mean particle size of about 5 microns. These particles were too large to penetrate the 50 to 500 millidarcy (md) Berea test cores. It was discovered that by using very small MgO particles, such as nanometer-sized particles, the particles would stay within the VES that flows into the subterranean formation during a treatment. These MgO nano-particles, may be used to stabilize VES-gelled aqueous fluids in place of (or in addition to) the larger sized MgO particles for water and/or gas control treatments.

This use of nanometer-sized particles is an improvement over the previous VES-gelled fluid stabilizing chemistry. Some nano-sized particles have a mean particle size of 30 nanometers (nm). One nano-MgO product was shown in laboratory tests to pass through the Berea test cores with no plating or accumulation of MgO particles on the core faces, which means nano particles are easy to flow into the porous media to stabilize the viscosity of the VES fluid. Viscosity stability tests show both particle types may achieve thermal stability of the VES-micelles at 250° F. (121° C.) over time.

The nano-sized MgO particles are also suspected of having additional chemistry useful for VES thermal stability. Without being limited to any one particular theory, it is suspected that some nano-sized MgO particles have unique particle surface charges that use charge attraction, surface adsorption and/or other chemistries to associate, relate or join the VES micelles. This technical improvement is helpful in the field when applying the MgO stabilizer technology, to assure VES-gelled fluid stability.

The stabilizing solid particulates and powders useful herein include, but are not necessarily limited to, slowly water-soluble alkaline earth metal oxides or alkaline earth metal hydroxides, or mixtures thereof. In one non-limiting embodiment, the alkaline earth metal in these additives may include, but are not necessarily limited to, magnesium, calcium, barium, strontium, combinations thereof and the like. In one non-limiting embodiment, MgO may be obtained in high purity of at least 95 wt %, where the balance may be impurities such as MgOH, CaO, CaOH, $SiO_2$, $Al_2O_3$, and the like. In the case of the alkali metal oxides and alkali metal hydroxides, the alkali metal includes, but is not necessarily limited to, lithium, potassium, sodium and mixtures thereof.

The amount of stabilizer particles in the VES-gelled aqueous fluid, whether or not nano-sized, may range from about 0.5 to about 20.0 pptg (about 0.06 to about 2.4 kg/1000 liters) or even up to about 40.0 pptg (about 4.8 kg/1000 liters). Alternatively, the lower threshold of the proportion range may be about 1.0 pptg (about 0.12 kg/1000 liters), while the upper threshold of proportion of the particles may independently be about 10.0 pptg (about 1.2 kg/1000 liters) pptg.

It has been discovered that the addition of pyroelectric crystal and/or piezoelectric crystal particles to an aqueous VES fluid demonstrate improved, enhanced or increased the viscosity of the VES fluid. The viscosity enhancers herein are believed to be particularly useful in VES-gelled fluids used for well completion or stimulation and other uses and applications where the viscosity of VES-gelled aqueous fluids may be increased, such as the water and/or gas shut off methods herein. It is especially useful that the viscosity enhancer particles may be very small to flow with VES fluid into the formation.

In one non-limiting explanation or theory, high temperatures and/or pressures heat and/or squeeze or press the crystal particles thereby causing more electrical charges on their surfaces. The particles with surface charges associate, connect or link the VES micelles, thus further increasing their network and enhancing the viscosity of the fluid system. In particular, the VES-gelled aqueous fluids have improved (increased, enhanced or raised) viscosity over a broad range of temperatures, such as from about 70 (about 21° C.) to about 400° F. (about 204° C.); alternatively up to about 350° F. (about 177° C.), and in another non-limiting embodiment up to about 300° F. (about 149° C.). With respect to pressure, in another non-limiting embodiment, effective pressures may range from about 1000 psi (about 6.7 MPa) to about 40,000 psi (about 300 MPa). Alternatively, the lower end of the suitable pressure range may be about 100 psi (about 0.7 MPa), while the upper end may independently be about 50,000 psi (about 340 Pa). In another alternate embodiment, the lower end may be about 300 psi and the upper end may independently be about 40,000 psi (about 2.0 MPa to about 276 MPa).

The discovery of the benefit of piezoelectric and/or pyroelectric crystals allows the VES system to have improved fluid viscosity to enhance the ability of the VES fluid to inhibit, prevent or shut off the flow of water and/or gas when the fluid is used as a plug or block or inhibitor to flow. Further, the introduction of these viscosity enhancers to the VES-gelled aqueous system will limit and reduce the amount of VES fluid which flows into the pores of a reservoir during a shut-off treatment. Enhancing the fluid viscosity of the VES-gelled fluids also helps reduce the amount of VES necessary to achieve a particular viscosity level. Thus the use of these viscosity enhancers in a VES-gelled aqueous system will improve the performance of the VES fluid while lowering treatment cost.

The viscosity enhancers useful herein include, but are not necessarily limited to, piezoelectric crystal particles, pyroelectric crystal particles, or mixtures thereof. Generally, pyroelectric crystals are also piezoelectric. Pyroelectric crystals generate electrical charges when heated and piezoelectric crystals generate electrical charges when squeezed, compressed or pressed.

In one non-limiting embodiment, specific viscosity enhancers may include, but are not necessarily limited to, ZnO, berlinite ($AlPO_4$), lithium tantalate ($LiTaO_3$), gallium orthophosphate ($GaPO_4$), $BaTiO_3$, $SrTiO_3$, $Pb(ZrTi)O_3$, $KNbO_3$, $LiNbO_3$, $LiTaO_3$, $BiFeO_3$, $Na_xWO_3$, $Ba_2NaNb_5O_5$, $Pb_2KNb_5O_{15}$, potassium sodium tartrate, tourmaline, topaz and mixtures thereof. The total pyroelectric coefficient of ZnO is $-9.4$ $C/m^2K$. ZnO and these and the other crystals are generally not water soluble.

In one non-limiting explanation, when the VES fluid mixed with very small pyroelectric crystals, such as nano-sized ZnO, is pumped downhole into underground formations that are under high temperature and/or high pressure, the pyroelectric crystals are heated and/or pressed and high surface charges are generated. These surface charges permit the crystal particles to associate, link, connect or otherwise relate the VES micelles together to increase fluid viscosity. The association or relation of the micelles is thought to be roughly analogous to the crosslinking of polymer molecules by crosslinkers. The high fluid viscosity is helpful and beneficial to reduce or stop the flow of water and/or gas from formation zones bearing them.

In another non-limiting embodiment, the viscosity enhancers herein do not include the suspension of colloidal particles employed in U.S. Pat. No. 7,081,439. More specifically, the viscosity enhancers herein do not include colloidal particles comprising a material selected from the group consisting of silica, aluminum oxide, antimony oxide, tin oxide, cerium oxide, yttrium oxide, zirconium oxide, or mica.

In one non-restrictive embodiment, the amount of viscosity enhancing additive ranges from about 0.1 to about 500 pounds per thousand gallons (pptg) (about 0.012 to about 60 $kg/m^3$) based on the aqueous viscoelastic treating fluid. In another non-restrictive embodiment, the amount of additive may have a lower limit of about 0.5 pptg (about 0.06 $kg/m^3$) and independently an upper limit of about 100 pptg (about 12 $kg/m^3$) or 200 pptg (about 24 $kg/m^3$), and in another non-restrictive version a lower limit of about 1 pptg (about 0.12 $kg/m^3$) and independently an upper limit of about 50 pptg (about 6 $kg/m^3$), and in still another non-limiting embodiment, a lower limit of about 2 pptg (about 0.2 $kg/m^3$) and independently an upper limit of about 20 pptg (about 2.4 $kg/m^3$).

In one non-limiting explanation, it appears that the viscosity enhancer pyroelectric and piezoelectric crystals may generate extra positive charges on the surface of the crystal particles. These positive charges will attract the anionic part in the micelle of VES-gelled fluids and form a strong network that increases fluid viscosity and plugs the pore throats of porous formation to reduce or stop the flow of water and/or gas. Another advantage for the pyroelectric and piezoelectric crystals being a good viscosity enhancer in VES-gelled fluids is that they are sufficiently small and may be easily flowed with VES fluid into the target formation.

In another non-limiting embodiment, the particle size of the stabilizer and/or viscosity enhancer additives and agents ranges between about 1 nanometer, independently up to about 500 nanometer. In another non-limiting embodiment, the particle size ranges between about 4 nanometers, independently up to about 100 nanometer. In another non-restrictive version, the particles may have a mean particle size of about 100 nm or less, alternatively about 50 nm or less, and in another possible version about 40 nm or less. In another non-limiting embodiment, the particle size of the viscosity enhancers ranges between about 1 nanometer independently up to about 2 microns.

The stabilizer and viscosity enhancer particles herein, whether or not of nano-size, may be added along with the VES fluids prior to pumping downhole or other application. The VES-gelled aqueous fluids are prepared by blending or mixing a VES into an aqueous fluid. The aqueous base fluid could be, for example, water, brine, aqueous-based foams or water-alcohol mixtures. The brine base fluid may be any brine, conventional or to be developed which serves as a suitable media for the various concentrate components. As a matter of convenience, in many cases the brine base fluid may be the brine available at the site used in the completion fluid or other application, for a non-limiting example.

In the method of the invention, an aqueous viscoelastic treating fluid, as a non-limiting example, is prepared by blending a VES into an aqueous fluid. The aqueous base fluid could be, for example, water, brine, aqueous-based foams or water-alcohol mixtures. The brine base fluid may be any brine, conventional or to be developed which serves as a suitable media for the various concentrate components. As a matter of convenience, in many cases the brine base fluid may be the brine available at the site used in the drilling fluid or other fluid, for a non-limiting example.

More specifically, in one non-limiting embodiment, the brines may be prepared using salts including, but not necessarily limited to, NaCl, KCl, $CaCl_2$, $MgCl_2$, $NH_4Cl$, $CaBr_2$, $NaBr_2$, sodium formate, potassium formate, and other commonly used stimulation and completion brine salts. The concentration of the salts to prepare the brines can be from about 0.5% by weight of water up to near saturation for a given salt in fresh water, such as 10%, 20%, 30% and higher percent salt by weight of water. The brine may be a combination of one or more of the mentioned salts, such as a brine prepared using NaCl and $CaCl_2$ or NaCl, $CaCl_2$, and $CaBr_2$ as non-limiting examples.

The viscoelastic surfactants suitable for use in this invention include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2 O^-$ may have the following structure (I):

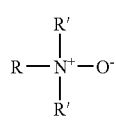

(I)

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amine oxide gelling agent is tallow amido propylamine oxide (TAPAO), which should be understood as a dipropylamine oxide since both R' groups are propyl.

Materials sold under U.S. Pat. No. 5,964,295 include ClearFRAC™, which may also comprise greater than 10% of a glycol. This patent is incorporated herein in its entirety by reference. One preferred VES is an amine oxide. As noted, a particularly preferred amine oxide is tallow amido propylamine oxide (TAPAO), sold by Baker Oil Tools as SurFRAQ™ VES. SurFRAQ is a VES liquid product that is 50% TAPAO and 50% propylene glycol. These viscoelastic surfactants are capable of gelling aqueous solutions to form a gelled base fluid. The additives of this invention may also be used in Diamond FRAQ™ which is a VES system, similar to SurFRAQ, which contains VES breakers sold by Baker Oil Tools.

The amount of VES included in the treating fluid depends on generating, creating or producing enough viscosity to control, inhibit or stop the rate of water and/or gas production. Thus, depending on whether gas or water is to be controlled, the geometry, pore sizes and other characteristics of the formation, the VES may be added to the aqueous fluid in concentrations ranging from about 0.5 to 12.0% by volume of the total aqueous fluid (5 to 120 gallons per thousand gallons (gptg)). In another non-limiting embodiment, the range for the present aqueous viscoelastic treating fluid may be from about 1.0 independently to about 6.0% by volume VES product. In an alternate, non-restrictive form of the invention, the amount of VES ranges from 2 independently to about 10 volume %.

The proportional makeup of the aqueous viscoelastic treating fluid composition may vary widely depending upon a number of factors including, but not necessarily limited to, the nature of the formation, the formation conditions (e.g. temperature, pressure, permeability, etc.), the particular composition components, the injection method, the interaction of these various factors, and the like. Thus, the proportions of the various components given above are only many of various one non-limiting embodiments that may be suitable herein.

Other optional components may be added, including, but not necessarily limited to, quaternary amines, alkoxylated quarternary amines, and alkoxylated phenols and alcohols (typically ethoxylated phenols and alcohols to help reduce clay swelling and/or reduce surface tension for more even distribution of the components. In another embodiment of the invention, the treatment fluid may contain other viscosifying agents, other different surfactants, clay stabilization additives, scale dissolvers, biopolymer degradation additives, and other common and/or optional components.

In another non-limiting embodiment herein, internal VES breakers may be used in the aqueous viscoelastic treating fluids herein, if relatively temporary or non-permanent water and/or gas shut-off control is desired.

The invention will be further illustrated with respect to certain experiments, but these examples are not intended to limit the invention, but only to further describe it in certain specific, non-limiting embodiments.

EXAMPLES

FIG. 1 is a graph of viscosity and shear rate as a function of time for a base fluid of 13.0 pptg (1.6 kg/m$^3$) $CaCl_2/CaBr_2$ brine containing 4% VES (WG-3L, Baker Oil Tools brand name), with and without 6 pptg (0.7 kg/m$^3$) viscosity enhancer at 150° F. (66° C.). FLC-42A is a 30 nm ZnO viscosity enhancer available from Baker Oil Tools. This graph shows that at low shear rates, the viscosity of the base fluid is high, but higher with the FLC-42A viscosity enhancer. The two sharp peaks of FIG. 1 indicate high viscosity at the low shear rate from static condition. Because the fluid used for water and/or gas shutoff will stay in static condition after pumping is done, the water and/or gas needs very high energy to initiate flow of the VES fluid. The two sharp peaks are repeated tests to measure the viscosity from stop to flow. The left axis of the graphs for both FIGS. 1 and 2 show the fluid viscosity at 100 second$^{-1}$ shear. When the fluid remains relatively static or quiet, the "viscosity" of the base without FLC-42A and then with FLC-42A are measured at about 2 second$^{-1}$. These data are overlay plotted, which give the peaks at about 80 minute and about 110 minute viewed at the right axis of FIG. 1.

FIG. 2 is a graph of viscosity and shear rate as a function of time for fluids gelled with 4% VES containing 13.0 pptg (1.6 kg/m$^3$) $CaCl_2/CaBr_2$ brine, with and without 6 pptg (0.7 kg/m$^3$) FLC-41A viscosity enhancer at 250° F. (121° C.) again demonstrating that at this elevated temperature and low shear rates, the viscosity of the base fluid is high, but higher with the FLC-41A viscosity enhancer. FLC-41A is a 30 nm MgO viscosity enhancer available from Baker Oil Tools. For FIG. 2, the 2 second$^{-1}$ shear rate viscosity peaks are at about 95 and 125 minute points.

FIG. 3 is a plot of flow back pressure recordings for an aqueous viscoelastic fluid having 4% VES and 3% KCl at 150° F. (66° C.) using a 1"×6" (2.54 cm×15.2 cm) Berea Sandstone core. Because of the exceptionally high viscosity at static and very low shear rates almost 1000 psi pressure differential (6.9 MPa) is required to make the VES fluid inside of the core to start flowing out. From static to start to flow, a VES fluid inside of a core has very high viscosity and initial resistance to flow. After the pressure differential increased to pass the threshold, the fluid starts to flow out, and the pressure differential will decrease as the viscosity reduces at high shear rate.

FIG. 4 is a graph of the viscosities over time of various fluids containing 6 pptg (0.7 kg/m$^3$) of various viscosity enhancers in a base fluid of 13.0 pptg (1.6 kg/m$^3$) $CaCl_2$/$CaBr_2$ brine and 4% WG-3L VES surfactant at 250° F. (121° C.) and shear rate 100 second$^{-1}$. It may be seen that all of the viscosity enhancer particles, ZnO, MgO, $TiO_2$ and $Al_2O_3$, which are nano-sized (hence the N— designation), help maintain the viscosity of the fluids over time, whereas the base fluid without these nano-sized viscosity enhancer particles gradually loses viscosity over time.

FIG. 5 is graph of return permeability to gas on 100 md Berea cores for VES fluids at 250° F. (121° C.) for 48 hours. The fluids are 13.0 pptg (1.6 kg/m$^3$) $CaCl_2$/$CaBr_2$ brine and 4% WG-3L VES surfactant with 6 pptg (0.7 kg/m$^3$) stabilizers. The $D_{50}$ of macro-stabilizers that are VES-STA1 MgO particles is 5 microns. The $D_{50}$ of nano-stabilizers that are nano MgO particles is 30 nm. The nano-stabilizers are easy to flow into the core with VES fluid to stabilize the fluid's viscosity inside of the core at 250° F. (121° C.), which resists gas flow through the core to achieve very low return permeability. However, the macro-stabilizers are blocked at core face due to their size and the viscosity of the VES fluid without stabilizer present inside of the core is significantly reduced, which is much easier to be pushed out by gas to reach very high return permeability. The term "macro-stabilizer" is used herein to refer to a stabilizer that is larger than micron-sized and larger than nano-sized. As noted, the $D_{50}$ of VES-STA1 MgO macro-stabilizers particles is 5 microns.

FIG. 6 is graph of VES viscosity changing with shear rates at 150° F. (66° C.). The fluid is 4% WG-3L VES surfactant mixing 7% KCl. At very low shear rate, the viscosity of VES fluid reaches to 5000 cps. At high shear rate, the viscosity is much lower.

Chemical compositions and methods are thus provided for inhibiting or shutting off the flow and/or production of water and/or gas in and from a subterranean formation. Further, chemical compositions and methods are provided for use in inhibiting or shutting off the flow and/or production of water and/or gas in and from a subterranean formation that may be injected at once and that which forms a uniform gel rather than discrete particles.

In the foregoing specification, the invention has been described with reference to specific embodiments thereof, and has been demonstrated as effective in providing a method of inhibiting and/or shutting off water and/or gas flow in subterranean formations. However, it will be evident that various modifications and changes can be made to the inventive compositions and methods without departing from the broader spirit or scope of the invention as set forth in the appended claims. Accordingly, the specification is to be regarded as illustrative rather than a restrictive sense. For example, specific combinations of VESs, stabilizers, viscosity enhancers and other components falling within the claimed parameters, but not specifically identified or tried in a particular composition or under specific conditions, are anticipated to be within the scope of this invention.

What is claimed is:

1. A method for permanently inhibiting the flow of water and/or gas in a subterranean formation comprising:
   injecting into the subterranean formation wherein water and/or gas zones and flow channels are present, an aqueous viscoelastic treating fluid comprising:
   brine,
   at least one viscoelastic surfactant, and
   at least one viscosity enhancer selected from the group consisting of pyroelectric particles, piezoelectric particles, and mixtures thereof, and
   at least one stabilizer selected from the group consisting of alkali earth metal oxides, alkali earth metal hydroxides, alkali metal oxides, alkali metal hydroxides, $Al_2O_3$, ZnO, $TiO_2$, MgO and mixtures thereof, and
   an absence of an internal breaker; and
   permitting the aqueous viscoelastic treating fluid to form a viscous plug in the subterranean formation and of a sufficient viscosity thereby permanently inhibiting the production of water and/or gas from the zones and flow channels while letting oil be produced.

2. The method of claim 1 where the subterranean formation is at a temperature greater than about 180° F. (82° C.).

3. The method of claim 2 where the stabilizer is present in an amount of ranging from about 0.5 to about 40.0 pptg (about 0.06 to about 4.8 kg/1000 liters) based on aqueous viscoelastic treating fluid.

4. The method of claim 2 where in the stabilizer, the alkali earth metal is selected from the group consisting of magnesium, calcium, strontium, barium and mixtures thereof, and the alkali metal is selected from the group consisting of lithium, sodium, potassium and mixtures thereof.

5. The method of claim 2 where the stabilizer is selected from the group consisting of MgO, $TiO_2$, $Al_2O_3$, and mixtures thereof.

6. The method of claim 1 where the viscosity enhancer is selected from the group consisting of ZnO, berlinite ($AlPO_4$), lithium tantalate ($LiTaO_3$), gallium orthophosphate ($GaPO_4$), $BaTiO_3$, $SrTiO_3$, $Pb(ZrTi)O_3$, $KNbO_3$, $LiNbO_3$, $LiTaO_3$, $BiFeO_3$, $Na_xWO_3$, $Ba_2NaNb_5O_5$, $Pb_2KNb_5O_{15}$, potassium sodium tartrate, tourmaline, topaz and mixtures thereof.

7. The method of claim 1 where the viscosity enhancer is present in an amount ranging from about 0.1 to about 500 pptg (about 0.012 to about 60 kg/m$^3$) based on the total aqueous viscoelastic treating fluid.

8. A method for permanently inhibiting the flow of water and/or gas in a subterranean formation comprising:
   injecting into the subterranean formation wherein water and/or gas zones and flow channels are present, an aqueous viscoelastic treating fluid comprising:
   brine,
   at least one viscoelastic surfactant,
   at least one stabilizer selected from the group consisting of alkali earth metal oxides, alkali earth metal hydroxides, alkali metal oxides, alkali metal hydroxides, $Al_2O_3$, ZnO, $TiO_2$, MgO and mixtures thereof, and
   at least one viscosity enhancer selected from the group consisting of pyroelectric particles, piezoelectric particles, and mixtures thereof having a size ranging from about 1 nanometer to about 5 microns, and
   an absence of an internal breaker; and
   permitting the aqueous viscoelastic treating fluid to form a viscous plug in the subterranean formation and of a sufficient viscosity thereby permanently inhibiting the production of water and/or gas from the zones and flow channels while letting oil be produced.

9. The method of claim 8 where the subterranean formation is at a temperature greater than about 180° F. (82° C.), where the alkali earth metal is selected from the group consisting of magnesium, calcium, strontium, barium and mixtures thereof, and the alkali metal is selected from the group consisting of lithium, sodium, potassium and mixtures thereof.

10. The method of claim 9 where the stabilizer is present in an amount ranging from about 0.5 to about 40.0 pptg (about 0.06 to about 4.8 kg/1000 liters) based on aqueous viscoelastic treating fluid.

11. The method of claim 9 where the stabilizer is selected from the group consisting of MgO, $TiO_2$, $Al_2O_3$, and mixtures thereof.

12. The method of claim 8 where the viscosity enhancer is selected from the group consisting of ZnO, berlinite ($AlPO_4$), lithium tantalate ($LiTaO_3$), gallium orthophosphate ($GaPO_4$), $BaTiO_3$, $SrTiO_3$, $Pb(ZrTi)O_3$, $KNbO_3$, $LiNbO_3$, $LiTaO_3$, $BiFeO_3$, $Na_xWO_3$, $Ba_2NaNb_5O_5$, $Pb_2KNb_5O_{15}$, potassium sodium tartrate, tourmaline, topaz and mixtures thereof.

13. The method of claim 8 where viscosity enhancer is present in an amount ranging from about 0.1 to about 500 pptg (about 0.012 to about 60 kg/m³) based on the total aqueous viscoelastic treating fluid.

14. A method for permanently inhibiting the flow of water and/or gas in a subterranean formation comprising:
    injecting into the subterranean formation wherein water and/or gas zones and flow channels are present an aqueous viscoelastic treating fluid comprising:
    brine,
    from about 0.5 to 12.0% by volume of the total aqueous fluid (5 to 120 gptg) of at least one viscoelastic surfactant,
    from about 0.5 to about 40.0 pptg (about 0.06 to about 4.8 kg/1000 liters) based on aqueous fluid of at least one stabilizer selected from the group consisting of alkali earth metal oxides, alkali earth metal hydroxides, alkali metal oxides, alkali metal hydroxides, $Al_2O_3$, ZnO, $TiO_2$, MgO and mixtures thereof, and
    from about 0.1 to about 500 pptg (about 0.012 to about 60 kg/m³) based on the total aqueous fluid of at least one viscosity enhancer selected from the group consisting of pyroelectric particles, piezoelectric particles, and mixtures thereof, and
    an absence of an internal breaker; and
    permitting the aqueous viscoelastic treating fluid to form a viscous plug in the subterranean formation and of a sufficient viscosity thereby inhibiting the production of water and/or gas from the zones and flow channels while letting oil be produced.

15. The method of claim 14 where in the stabilizer, the alkali earth metal is selected from the group consisting of magnesium, calcium, strontium, barium and mixtures thereof, and the alkali metal is selected from the group consisting of lithium, sodium, potassium and mixtures thereof.

16. The method of claim 14 where the stabilizer is selected from the group consisting of MgO, $TiO_2$, $Al_2O_3$, and mixtures thereof.

17. The method of claim 14 where the viscosity enhancer has a size ranging from about 1 nanometer to about 5 microns.

18. The method of claim 14 where the viscosity enhancer is selected from the group consisting of ZnO, berlinite ($AlPO_4$), lithium tantalate ($LiTaO_3$), gallium orthophosphate ($GaPO_4$), $BaTiO_3$, $SrTiO_3$, $Pb(ZrTi)O_3$, $KNbO_3$, $LiNbO_3$, $LiTaO_3$, $BiFeO_3$, $Na_xWO_3$, $Ba_2NaNb_5O_5$, $Pb_2KNb_5O_{15}$, potassium sodium tartrate, tourmaline, topaz and mixtures thereof.

* * * * *